3,169,959
METHOD OF OBTAINING SMILAGENIN
Helen C. Printy, Joliet, and Earl E. Dailey and Francis A. Taylor, Chicago, Ill., assignors to Intermediates Incorporated, Joliet, Ill., a corporation of Delaware
Filed July 23, 1963, Ser. No. 297,016
10 Claims. (Cl. 260—239.55)

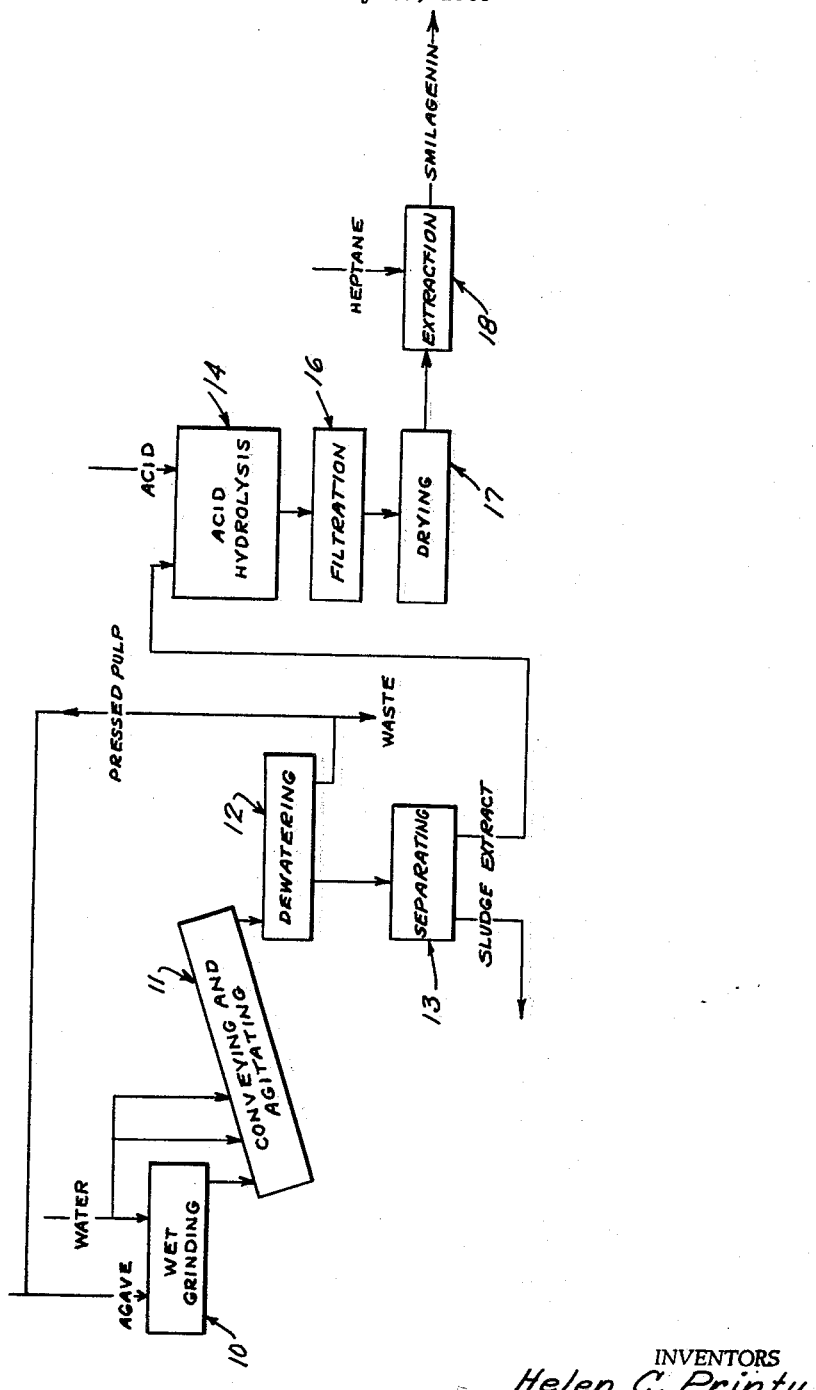

The present invention relates to the recovery and purification of steroidal sapogenins from plants containing the corresponding saponins. More specifically, it is directed to the extraction of steroidal compounds from plants of the genus Amaryllidacea, and specifically those of the Agave species. The invention finds its greatest applicability to the extraction and purification of smilagenin from the plant *Agave lecheguilla*.

The compound smilagenin has been employed in animal feed and has substantial utility as an intermediate in the preparation of compounds of the pregane series. Smilagenin is understood to have the following structural formula:

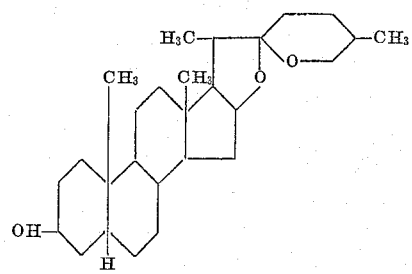

By conventional chemical procedures, smilagenin is hydrolyzed to produce, for example, the compound 3β-hydroxy-16-pregane-20-one which has the following structural formula:

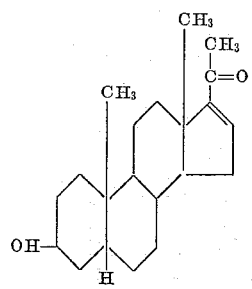

The foregoing compound is used as an intermediate in the preparation of many steroidal compounds of known pharmaceutical and medicinal properties including steroids such as progesterone:

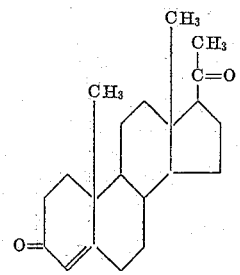

and cortisone:

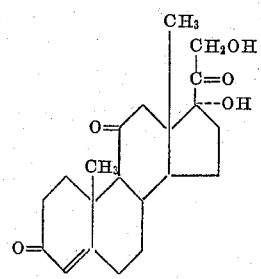

The plant *Agave lecheguilla* is a tough desert weed containing from about 40 to 60% water. It grows as a clump of long, narrow leaves curving from a shallow rootstock. The leaves are individually edged and tipped with sharp thorns. Each leaf contains a bundle of long tough fibers extending from the base of the leaf to the tip. These fibers are embedded in a rather firm meat or pulp. The entire leaf is covered with a thin, tough waxy transparent layer of "skin" which protects the plant from dying in the dry desert air. The fibers are so tough that they are used commercially in heavy duty polishing brushes. The well guarded pulp contains water, waxes, pigments, enzymes, carbohydrates, and other plant constituents, and also contains a water soluble sugar-steroid, smilonin.

The compound smilonin is a saponin containing a hydrophilic sugar constituent and a hydrophobic constituent consisting of smilagenin. Smilonin has a marked detergent action and is used widely as a cleaning agent.

There are many practical problems arising in the extraction of smilonin from the Agave because of the nature of the weed. It is extremely difficult to cut the fibers and, because of the waterproof "skin" is has been a problem to break the plant up into small enough pieces so that water could penetrate the pulp and dissolve the smilonin effectively. Because the smilonin is a soap-like substance, as soon as it is mixed with water it forms heavy thick foams which are extremely difficult to handle. The foam occupies an unpredictable volume in the processing equipment, it reduces the efficiency of the pumping system, and it complicates the subsequent hydrolyis process. The entire plant, especially the fibrous portion, behaves like a sponge and it is accordingly hard to remove water from the chopped wet plant. It has therefore been necessary to apply sizable pressures to the wet mass to press the water or saponin solution from it. However, when sufficient force has been used to cause an acceptable amount of dewatering, large amounts of pulp skin and fiber particles are forced into the expressed liquor. These particles, particularly of skin and pulp, carry along with them some water insoluble waxes. When a solution of the saponin is heated with acid to effect hydrolysis, the soluble saponin is split into the water insoluble smilagenin and the constituent sugar. Other soluble substances, particularly sugars, starches and proteins are changed by the action of the acid into insoluble products and precipitate along with the smilagenin. When the juice pressed from the ground weed contains a large amount of skin, pulp and fiber, all water insoluble materials, this additional amount of insoluble material carries through and contaminates the crude smilagenin product. When the hydrolysis is completed, the residual acid may be neutralized with caustic to avoid corrosion of equipment, and the solid brown powder containing the crude smilagenin is separated from the liquor by filtration.

Crude smilagenin is typically dissolved or leached out of the brown powder by hot heptane. This solvent also dissolves many other substances contained in the brown powder such as oils, waxes, and pigments. The hot heptane solution of these materials must then be separated from the insoluble residue. However, the insoluble residue holds back a large amount of the heptane solution and since the retained portion of the solution contains a sizable amount of smilagenin, the amount of solution held back must be reduced or diluted if all of the smilagenin available is to be obtained.

With the foregoing in mind, an object of the present invention is to provide an improved process for the extraction and purification of smilagenin from plants containing smilonin.

Another object of the invention is to provide a method for recovering the compound smilagenin from *Agave lecheguilla* in considerably higher yields than has heretofore been obtained.

Still another object of the invention is to provide an improved method for grinding the plant *Agave lecheguilla* to improve the quality and yield of smilagenin which is obtainable therefrom.

Still another object of the invention is to provide an improved method for the purification of crude smilagenin materials.

The overall process for the production of smilagenin according to the present invention has been illustrated in the flow chart which accompanies this description. A further description of the invention will be made in conjunction with this flow chart for the purposes of illustration only, recognizing that various processing variables may be modified somewhat from the specific conditions recited in this description.

As shown in the flow chart, *Agave lecheguilla*, as is, is introduced along with water to a wet grinding stage represented at reference numeral 10. We have found it convenient to use a Reitz Prebreaker in which the shaft is driven at about 62 r.p.m. to effect this wet grinding. The weed is introduced into the wet grinding stage at a rate of from 5 to 50 pounds per minute or so, and the water at a temperature of 50° to 75° C. can be introduced at rates varying from about 1 to 4 gallons of water per minute per ton of weed. This wet grinding step is extremely important in securing the improved results of the present invention as will be apparent from a succeeding portion of the specification.

The wet mass is discharged from the grinding step at temperatures between about 65 and 70° C. Care should be exercised so that the temperature of the chopped mass does not exceed about 70° C. The rate of water addition is such that the wet mass flows smoothly from the discharge of the prebreaker onto a screw conveyor which is indicated at reference numeral 11 in the drawings. Additional amounts of water are introduced into the screw conveyor 11 by means of spray nozzles which wet the mass that travels in the conveyor. The speed of this screw is such that there is a substantial retention time of the mass in the conveyor to assure thorough digestion of the mass with water. Times of from 2 to 30 minutes are appropriate for this retention and agitation, with about 10 minutes being typical. The water introduced into the screw conveyor 11 and the wet grinding stage 10 is adjusted so that the total water ratio is about 3 times the feed rate of the Agave.

After the prolonged contact in the screw conveyor 11, the mass is fed into a dewatering press 12 which produces a pressed pulp and an extract. The pressed pulp, as indicated in the flow diagram, may be discharged to waste or it may be recycled along with additional amounts of Agave to the wet grinding stage 10.

The extract is delivered to a separating stage 13 where pulp and other solids which may have passed through the retaining screens of the press are removed. In some instances, it is adequate to merely settle the extract by means of a weir tank or the like to produce a relatively clear extract. Particularly good results are obtained, however, if the separation is done in a high speed centrifuge in which the applied centrifugal force is in the range from about 500 to 50,000 g.

The extract from the separation stage 13 is directed to an acid hydrolysis vessel 14 where it is treated with a mineral acid such as sulphuric acid of a concentration of about 66° Bé. In this stage, the pH is adjusted to about 1 and the saponin extract containing about 6% dissolved solids is heated to a temperature of about 90° C. and stirred for 1 hour or so. This hydrolysis treatment results in a brown precipitate which is filtered in a filtration step 16 washed thoroughly with hot water, and dried in a drying stage 17.

In some cases, particularly where efficient centrifuging is achieved, the crystalline smilagenin obtained at this stage is sufficiently pure for further processing without further treatment. Where the product has crystalline smilagenin of low purity, however, the following treatment may be carried out.

The crude smilagenin is treated for the removal of waxes, oils and pigments in an extraction stage 18, by a process of controlled differential solubility in heptane or other solvent for the lipids (steroids and waxes). Heptane is introduced into the stage 18 and the extraction is operated at a temperature above the boiling point of the solvent. During the extraction, the mixture is agitated thoroughly and heated until a substantial amount (10 to 40% or so) of the solvent is distilled over. The resulting thick slurry is then cooled carefully below the boiling point of the solvent, but not in excess of about 68° C. Specifically, it is preferred to cool the slurry to a temperature of about 68 to 72° C. Care must be exercised not to allow the batch temperature to fall below about 68° C., since precipitation of the impurities may occur. The hot slurry is then centrifuged as rapidly as possible, and the cake is washed well with additional amounts of solvent. The product which results is a relatively wax-free smilagenin M.P. 182–190°; $[\alpha]_D$ −63°±2°.

The following specific examples illustrate the specific processing conditions which may exist in the process.

EXAMPLE I

One thousand five hundred pounds of intact *Agave lecheguilla* was fed at a constant rate of 25 pounds per minute into an efficient hammer mill (Reitz Prebreaker) with a constant flow of 2 gallons of water per minute at 65° C. The resulting pulped material is conveyed through a screw conveyor with a hold up time of 10 minutes to a dewatering press. The expressate (4400 pounds) was passed through a solid bowl continuous centrifuge operating at a force of 1000 g to separate the saponin solution from the undesirable solids. The clarified saponin solution was hydrolyzed with a 5% by volume sulphuric acid solution, the precipitated crude smilagenin filtered, and relatively pure smilagenin was obtained by crystallization from heptane. In this manner, a 1% yield based on total weed, as is, of pure smilagenin having a melting point of 184 to 188° and a softening point at 176° C. was obtained. This amounts to approximately a 2% yield on a dry basis.

EXAMPLE II

To illustrate the difference in yield obtained when a dry milling process is used, 500 pounds of intact *Agave lecheguilla* was dry ground in an efficient hammer mill. The ground material was then covered with 1000 pounds of water and the mixture was agitated at 65° C. for 30 minutes. The slurry which resulted was then fed into a continuous dewatering press. The total expressate, treated as in Example I, provided 0.69% of crude smilagenin having a melting point of 175 to 181, and softening at 165° C.

EXAMPLE III

Random samples of *Agave lecheguilla* leaves weighing 300 grams were bisected longitudinally into two equal portions. Portion A was ground as is, then covered with 10 parts of water at 65° C. The mixture was agitated for 45 minutes, the liquor was separated, hydrolyzed with acid, and the smilagenin isolated. Portion B was ground for 9 minutes with 10 parts of water at 65° C., and the liquor worked up as with Portion A. The increased efficiency of wet grinding is indicated in the following table:

*Table*

| Run | Percent Smilagenin | |
|---|---|---|
| | A | B |
| 1 | 0.85 | 1.12 |
| 2 | 0.79 | 1.11 |
| 3 | 0.65 | 0.95 |

EXAMPLE IV

Twenty-eight tons of intact *Agave lecheguilla* was dry ground through an efficient cutter and extracted with agitation for 6 hours with 66 tons of water at 65° C. The saponin solution was drawn-off, hydrolyzed with acid, and the precipitated solid filtered. Extraction and crystallization from heptane provided 64.8 kilograms (0.255%) of crude smilagenin and having a melting point of 175–181° C., and the softening point of 155° C.

EXAMPLE V

Twenty-six tons of intact *Agave lecheguilla* was wet ground through a hammer mill with 50 tons of water at 65° C. The saponin solution was removed by a continuous dewatering press and the extract was treated as in Example IV. Crystallization from heptane gave 120 kilograms (0.505%) of crude smilagenin having a melting point of 174 to 180°, and a softening point at 155° C.

EXAMPLE VI

The beneficial effects of high speed centrifuging in the separating zone 13 were determined by comparing the results obtained when employing an ordinary settling weir tank with those obtained from using high speed centrifuge. With the ordinary settling tank, from each ton of *Agave lecheguilla*, about 120 to 123 pounds of the brown powder were obatined containing 60 to 65% fibrous material, pulp and dirt, 20 to 30% waxes and oils, and 10 to 15% crude smilagenin. With centrifuging, however, for each ton of *Agave lecheguilla* about 60 to 75 pounds of brown powder is obtained, containing 40 to 55% fibrous material, pulp and dirt, 20 to 30% waxes and oils, and 30 to 40% smilagenin.

With centrifuging, the heptane extract provides a purer crystallized smilagenin. In the process involving ordinary settling, the smilagenin typically contained 70 to 80% refined smilagenin and 20 to 30% waxy material. The new process involving centrifuging yields a crystalline smilagenin containing 92 to 98% refined smilagenin and only 2 to 8% of waxy material.

From the foregoing, it will be understood that the process of the present invention provides for the recovery of smilagenin in greater yields than has heretofore been possible, while providing a product of greater purity. It should also be evident that various modifications can be made to the described embodiments without departing from the scope of the present invention.

We claim as our invention:

1. The method of recovering smilagenin from a plant source containing smilonin which comprises wet grinding said source, agitating the ground mass in the presence of water, pressing liquid out of the resulting pulp to produce a pressed pulp and an extract, separating said pulp from said extract, and hydrolyzing the extract with a mineral acid to precipitate a smilagenin product.

2. The method of claim 1 in which said source is *Agave lecheguilla*.

3. The method of recovering smilagenin from the plant *Agave lecheguilla* which comprises wet grinding said plant, agitating the ground mass in the presence of water, pressing liquid out of the resulting pulp to produce a pressed pulp and an extract, centrifuging the extract to separate solids from a saponin solution, hydrolyzing the saponin solution with a mineral acid to precipitate a crude smilagenin product and thereafter treating the crude product with a solvent for the lipids contained therein, and recovering smilagenin from the resulting extract.

4. The method of claim 3 in which said extract is centrifuged with an applied centrifugal force in the range from 500 to 50,000 g.

5. The method of recovering smilagenin from the plant *Agave lecheguilla* which comprises wet grinding the plant at a temperature in the range from 50 to 75° C., agitating the ground mass in the presence of water, pressing liquid out of the resulting pulp, centrifuging the extract from said pressing to isolate a saponin solution, hydrolyzing the saponin solution with a mineral acid to precipitate a crude smilagenin product and thereafter extracting the crude product with a solvent for the waxes contained therein, and recovering a substantially wax-free smilagenin.

6. The method of recovering smilagenin from the plant *Agave lecheguilla* which comprises wet grinding the plant at a temperature in the range from 50 to 75° C., agitating the ground mass in the presence of water, pressing liquid out of the resulting pulp, centrifuging the extract from said pressing to isolate the saponin solution, hydrolyzing the saponin solution with a mineral acid to precipitate a crude smilagenin product, and thereafter extracting the crude product with heptane to recover a substantially wax-free smilagenin.

7. In a method of separating waxes from crude smilagenin, the steps of treating the crude smilagenin with a solvent for waxes at a temperature above the boiling point of the solvent and under agitation until a substantial proportion of the solvent has been distilled off, cooling the resulting slurry to a temperature of below the boiling point of said solvent but not below about 68° C., centrifuging the cooled slurry, and recovering a substantially wax-free smilagenin from the cake thus produced.

8. In a method of separating waxes from crude smilagenin, the steps of treating the crude smilagenin with heptane under agitation and at a temperature above the boiling point of heptane until a substantial proportion of the heptane has been distilled off, cooling the resulting slurry to a temperature in the range from about 68 to 72° C., centrifuging the cooled slurry, and recovering a substantially wax-free smilagenin from the cake thus produced.

9. The method of recovering smilagenin from the plant *Agave lecheguilla* which comprises wet grinding said plant at a temperature in the range from 50 to 75° C., agitating the ground mass in the presence of water, pressing liquid out of the resulting pulp, centrifuging the extract from said pressing at an applied centrifugal force of 500 to 50,000 g. to thereby separate a saponin solution, and hydrolyzing the saponin solution with a mineral acid to precipitate a crude smilagenin product.

10. The method of recovering smilagenin from the plant *Agave lecheguilla* which comprises wet grinding said plant at a temperature in the range from 50 to 75° C., agitating the ground mass in the presence of water at a temperature not in excess of about 70° C. for a period of from 2 to 30 minutes, pressing liquid from the resulting pulp to produce an aqueous extract, centrifuging said extract at an applied centrifugal force of 500 to 50,000 g to thereby separate a clear extract, hydrolyzing said clear extract with sulfuric acid at a pH of about 1 to precipitate a crude smilagenin product thereform, extracting lipids from said crude product with heptane at a temperature above the boiling point of heptane, cooling the resulting thick slurry below the boiling point of heptane but not below 68° C., and then separating a purified smilagenin from the slurry.

References Cited by the Examiner
UNITED STATES PATENTS

| Re. 23,008 | 6/48 | Wagner | 260—239.55 |
| 2,774,714 | 12/56 | Hershberg et al. | 260—239.55 |
| 2,780,620 | 2/57 | Krider et al. | 260—239.55 |

LEWIS GOTTS, *Primary Examiner.*